(12) United States Patent
Moresmau et al.

(10) Patent No.: US 11,941,137 B2
(45) Date of Patent: *Mar. 26, 2024

(54) USE OF MULTI-FACETED TRUST SCORES FOR DECISION MAKING, ACTION TRIGGERING, AND DATA ANALYSIS AND INTERPRETATION

(71) Applicant: ASG Technologies Group, Inc., Naples, FL (US)

(72) Inventors: Jean-Philippe Moresmau, Saint Guilhem le Desert (FR); Marcus MacNeill, Austin, TX (US)

(73) Assignee: ASG Technologies Group, Inc., Waltham, MA (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/071,861

(22) Filed: Oct. 15, 2020

(65) Prior Publication Data
US 2021/0117563 A1    Apr. 22, 2021

Related U.S. Application Data

(63) Continuation-in-part of application No. 16/795,570, filed on Feb. 19, 2020.

(60) Provisional application No. 62/923,377, filed on Oct. 18, 2019.

(51) Int. Cl.
*G06F 21/62* (2013.01)

(52) U.S. Cl.
CPC ................ *G06F 21/6218* (2013.01)

(58) Field of Classification Search
CPC .................................. G06F 21/6218

USPC ......................................................... 707/692
See application file for complete search history.

(56) References Cited

U.S. PATENT DOCUMENTS

| | | | |
|---|---|---|---|
| 5,321,610 | A | 6/1994 | Breslin |
| 5,528,263 | A | 6/1996 | Platzker et al. |
| 5,742,285 | A | 4/1998 | Ueda |
| 6,069,957 | A | 5/2000 | Richards |
| 6,208,345 | B1 | 3/2001 | Sheard et al. |

(Continued)

FOREIGN PATENT DOCUMENTS

| | | |
|---|---|---|
| EP | 3430529 A1 | 1/2019 |
| EP | 3714604 A1 | 9/2020 |

(Continued)

OTHER PUBLICATIONS

"International Search Report" and "Written Opinion of the International Searching Authority," Patent Cooperation Treaty Application No. PCT/US2017/022295, dated Jun. 1, 2017, 9 pages.

(Continued)

*Primary Examiner* — Vaishali Shah
(74) *Attorney, Agent, or Firm* — Carr & Ferrell LLP

(57) ABSTRACT

Provided are methods and systems for using multi-faceted trust scores in data security. A method may commence with determine a plurality of data facets for a data item. The method may further include determining a plurality of parameters and weights corresponding to the plurality of data facets associated with the data item. Upon determining the plurality of parameters and weights, at least one trust score for the data item may be calculated based on the plurality of parameters and weights. The method may further include selectively taking an action based on the at least one trust score.

10 Claims, 6 Drawing Sheets

(56) References Cited

U.S. PATENT DOCUMENTS

| | | |
|---|---|---|
| 6,331,855 B1 | 12/2001 | Schauser |
| 6,574,321 B1 | 6/2003 | Cox et al. |
| 6,597,363 B1 | 7/2003 | Duluk |
| 6,950,825 B2 | 9/2005 | Chang et al. |
| 7,073,164 B1 | 7/2006 | Knowles |
| 7,359,076 B2 | 4/2008 | Uchino |
| 7,937,665 B1 | 5/2011 | Vazquez et al. |
| 8,078,731 B1 | 12/2011 | Bruder et al. |
| 8,667,456 B1 | 3/2014 | Czymontek |
| 8,745,011 B2 | 6/2014 | Kishi |
| 9,032,076 B2 | 5/2015 | Buehler et al. |
| 9,053,295 B1 | 6/2015 | Wick et al. |
| 9,213,707 B2 | 12/2015 | Conner |
| 9,232,491 B2 | 1/2016 | Mahaffey |
| 9,483,537 B1 | 11/2016 | Peters et al. |
| 9,621,428 B1 | 4/2017 | Lev et al. |
| 9,910,655 B1 | 3/2018 | Ranganathan et al. |
| 10,162,624 B1 | 12/2018 | Moturu et al. |
| 10,181,059 B1 | 1/2019 | Brewton et al. |
| 10,355,864 B2 | 2/2019 | Konduru |
| 10,318,762 B1 | 6/2019 | Buckingham et al. |
| 10,348,505 B1 | 7/2019 | Crawforth et al. |
| 10,812,611 B2 | 10/2020 | Bennet et al. |
| 10,877,740 B2 | 12/2020 | Bennet et al. |
| 11,055,067 B2 | 7/2021 | Thangaraj et al. |
| 11,057,500 B2 | 7/2021 | Aragón et al. |
| 11,086,751 B2 | 8/2021 | Moresmau et al. |
| 11,172,042 B2 | 11/2021 | Bennet et al. |
| 11,269,660 B2 | 3/2022 | Yueh |
| 2002/0099952 A1 | 7/2002 | Lambert et al. |
| 2002/0103731 A1 | 8/2002 | Barnard et al. |
| 2002/0184610 A1 | 12/2002 | Chong et al. |
| 2002/0196277 A1 | 12/2002 | Bushey et al. |
| 2003/0046401 A1 | 3/2003 | Abbott et al. |
| 2003/0079052 A1 | 4/2003 | Kushnirskly |
| 2004/0003119 A1 | 1/2004 | Munir et al. |
| 2004/0003371 A1 | 1/2004 | Coulthard et al. |
| 2004/0078373 A1 | 4/2004 | Ghoneimy et al. |
| 2004/0128001 A1 | 7/2004 | Levin et al. |
| 2004/0153994 A1 | 8/2004 | Bates et al. |
| 2004/0177323 A1 | 9/2004 | Kaasila et al. |
| 2004/0267749 A1 | 12/2004 | Bhat et al. |
| 2005/0038764 A1 | 2/2005 | Minsky et al. |
| 2005/0065845 A1 | 3/2005 | DeAngelis |
| 2005/0235258 A1 | 10/2005 | Wason |
| 2005/0278695 A1 | 12/2005 | Synovic |
| 2006/0026591 A1 | 2/2006 | Backhouse |
| 2006/0029659 A1 | 2/2006 | Backhouse |
| 2006/0031854 A1 | 2/2006 | Godwin |
| 2006/0036448 A1 | 2/2006 | Haynie et al. |
| 2006/0036941 A1 | 2/2006 | Neil |
| 2006/0039466 A1 | 2/2006 | Emerson et al. |
| 2006/0111888 A1 | 5/2006 | Hiew et al. |
| 2006/0184925 A1 | 8/2006 | Ficatier et al. |
| 2006/0251047 A1 | 11/2006 | Shenfield et al. |
| 2006/0265719 A1 | 11/2006 | Asti |
| 2006/0271528 A1 | 11/2006 | Gorelik |
| 2006/0294151 A1* | 12/2006 | Wong .................... G06Q 30/02 |
| 2007/0016624 A1 | 1/2007 | Powers et al. |
| 2007/0028286 A1 | 2/2007 | Greene et al. |
| 2007/0033637 A1 | 2/2007 | Yami et al. |
| 2007/0073671 A1 | 3/2007 | McVeigh et al. |
| 2007/0094594 A1 | 4/2007 | Matichuk |
| 2007/0135936 A1 | 6/2007 | Dumas |
| 2007/0156764 A1 | 7/2007 | O'Connell et al. |
| 2007/0180367 A1 | 8/2007 | Chiang |
| 2007/0180444 A1 | 8/2007 | Hoover et al. |
| 2007/0198450 A1 | 8/2007 | Khalsa |
| 2007/0208685 A1 | 9/2007 | Blumenau |
| 2007/0266394 A1 | 11/2007 | Odent et al. |
| 2007/0294406 A1 | 12/2007 | Suer et al. |
| 2008/0109292 A1 | 5/2008 | Moore |
| 2008/0126932 A1 | 5/2008 | Elad et al. |
| 2008/0141141 A1 | 6/2008 | Moore |
| 2008/0189617 A1 | 8/2008 | Covell et al. |
| 2008/0209390 A1 | 8/2008 | Dutta et al. |
| 2008/0229303 A1 | 9/2008 | Carteri et al. |
| 2008/0281727 A1 | 11/2008 | Moss |
| 2009/0024589 A1* | 1/2009 | Sood .................... G06F 16/972 707/E17.135 |
| 2009/0024660 A1 | 1/2009 | Borgsmidt et al. |
| 2009/0025063 A1 | 1/2009 | Thomas |
| 2009/0083306 A1 | 3/2009 | Sichi et al. |
| 2009/0094112 A1 | 4/2009 | Cesarini et al. |
| 2009/0124387 A1 | 5/2009 | Perlman et al. |
| 2009/0249290 A1 | 10/2009 | Jenkins et al. |
| 2009/0249446 A1 | 10/2009 | Jenkins et al. |
| 2010/0106560 A1* | 4/2010 | Li .......................... G06Q 10/06 705/347 |
| 2010/0114628 A1 | 5/2010 | Adler et al. |
| 2010/0131857 A1 | 5/2010 | Prigge |
| 2010/0153866 A1 | 6/2010 | Sharoni |
| 2010/0169265 A1* | 7/2010 | Ristock ............... G06Q 10/0637 705/320 |
| 2010/0225658 A1 | 9/2010 | Coleman |
| 2010/0226441 A1 | 9/2010 | Tung et al. |
| 2010/0231599 A1 | 9/2010 | Tung et al. |
| 2010/0245563 A1 | 9/2010 | Golovchinsky et al. |
| 2010/0250497 A1* | 9/2010 | Redlich ................. H04L 63/105 707/661 |
| 2010/0274815 A1 | 10/2010 | Vanasco |
| 2011/0004564 A1 | 1/2011 | Rolia et al. |
| 2011/0029947 A1 | 2/2011 | Markovic |
| 2011/0078708 A1 | 3/2011 | Dokovski et al. |
| 2011/0107298 A1 | 5/2011 | Sebastian |
| 2011/0107309 A1 | 5/2011 | Baron |
| 2011/0107313 A1 | 5/2011 | Baron |
| 2011/0246904 A1 | 10/2011 | Pinto et al. |
| 2011/0276636 A1 | 11/2011 | Cheng et al. |
| 2012/0072509 A1 | 3/2012 | Booth |
| 2012/0075333 A1 | 3/2012 | Chen et al. |
| 2012/0310381 A1 | 12/2012 | Karaffa |
| 2012/0310875 A1 | 12/2012 | Prahlad et al. |
| 2012/0324358 A1 | 12/2012 | Jooste |
| 2012/0331527 A1 | 12/2012 | Walters et al. |
| 2013/0031158 A1 | 1/2013 | Salsburg |
| 2013/0117662 A1 | 5/2013 | Shan et al. |
| 2013/0151557 A1 | 6/2013 | Shanken et al. |
| 2013/0174028 A1 | 7/2013 | Grossman et al. |
| 2013/0177662 A1 | 7/2013 | Msika |
| 2013/0275475 A1 | 10/2013 | Ahlborn |
| 2013/0332423 A1 | 12/2013 | Puri et al. |
| 2013/0339872 A1 | 12/2013 | Shuster |
| 2014/0026113 A1 | 1/2014 | Farooqi |
| 2014/0032875 A1 | 1/2014 | Butler |
| 2014/0047011 A1 | 2/2014 | Lahav et al. |
| 2014/0047413 A1 | 2/2014 | Sheive et al. |
| 2014/0075407 A1 | 3/2014 | Donis et al. |
| 2014/0089388 A1 | 3/2014 | Curry et al. |
| 2014/0114907 A1 | 4/2014 | Kozina et al. |
| 2014/0114962 A1 | 4/2014 | Rosenburg et al. |
| 2014/0207575 A1 | 7/2014 | Freed-Finnegan et al. |
| 2014/0245199 A1 | 8/2014 | Belotti et al. |
| 2014/0282453 A1 | 9/2014 | O'Rourke et al. |
| 2014/0288923 A1 | 9/2014 | Marian et al. |
| 2014/0288945 A1 | 9/2014 | Boerner et al. |
| 2014/0380105 A1 | 12/2014 | Michel et al. |
| 2015/0006543 A1 | 1/2015 | Jin et al. |
| 2015/0012478 A1 | 1/2015 | Mohammad et al. |
| 2015/0046930 A1 | 2/2015 | Phadke |
| 2015/0088933 A1 | 3/2015 | Schofield et al. |
| 2015/0127660 A1* | 5/2015 | Zilberberg ........ G06F 16/24578 707/748 |
| 2015/0128105 A1 | 5/2015 | Sethi et al. |
| 2015/0271206 A1* | 9/2015 | Schultz .................. H04L 63/20 726/3 |
| 2015/0293764 A1 | 10/2015 | Visvanathan |
| 2015/0379303 A1 | 12/2015 | LaFever et al. |
| 2016/0026968 A1 | 1/2016 | Fan et al. |
| 2016/0034260 A1 | 2/2016 | Ristock et al. |
| 2016/0034571 A1 | 2/2016 | Setayesh et al. |
| 2016/0044380 A1 | 2/2016 | Barrett |
| 2016/0070541 A1 | 3/2016 | Lee et al. |
| 2016/0117159 A1 | 4/2016 | Balko |

(56) References Cited

U.S. PATENT DOCUMENTS

| | | |
|---|---|---|
| 2016/0140204 A1 | 5/2016 | Brown et al. |
| 2016/0253340 A1 | 9/2016 | Barth et al. |
| 2016/0267060 A1 | 9/2016 | Skirpa et al. |
| 2016/0267082 A1 | 9/2016 | Wong et al. |
| 2016/0275439 A1 | 9/2016 | Avats |
| 2016/0283200 A1 | 9/2016 | Standley et al. |
| 2016/0299933 A1 | 10/2016 | Fillipi et al. |
| 2016/0359711 A1 | 12/2016 | Deen et al. |
| 2017/0034306 A1 | 2/2017 | Thangeswaran |
| 2017/0039041 A1 | 2/2017 | Bommireddi |
| 2017/0068395 A1 | 3/2017 | Massoudi |
| 2017/0118284 A1 | 4/2017 | Chen et al. |
| 2017/0123751 A1 | 5/2017 | Sigurösson et al. |
| 2017/0154026 A1 | 6/2017 | Gong et al. |
| 2017/0180284 A1 | 6/2017 | Smullen et al. |
| 2017/0199936 A1 | 7/2017 | Steelberg et al. |
| 2017/0228119 A1 | 8/2017 | Hosbettu et al. |
| 2017/0269972 A1 | 9/2017 | Hosabettu et al. |
| 2017/0270022 A1 | 9/2017 | Moresmau et al. |
| 2017/0339564 A1 | 11/2017 | Momchilov et al. |
| 2017/0344227 A1 | 11/2017 | Stoicov et al. |
| 2017/0357814 A1* | 12/2017 | Mahaffey ............... H04W 12/12 |
| 2017/0372442 A1 | 12/2017 | Mejias |
| 2018/0060370 A1* | 3/2018 | Eshwar ................. G06F 16/215 |
| 2018/0089005 A1 | 3/2018 | Green |
| 2018/0121841 A1 | 5/2018 | Harris |
| 2018/0129497 A1 | 5/2018 | Biddle et al. |
| 2018/0167426 A1 | 6/2018 | Sigurdsson et al. |
| 2018/0174104 A1 | 6/2018 | Schikora et al. |
| 2018/0191761 A1 | 7/2018 | Lee et al. |
| 2018/0197123 A1 | 7/2018 | Parimelazhagan et al. |
| 2018/0322396 A1 | 11/2018 | Ahuja-Cogny et al. |
| 2018/0367506 A1 | 12/2018 | Ford et al. |
| 2019/0081935 A1 | 3/2019 | Broussard et al. |
| 2019/0129734 A1 | 5/2019 | Yang et al. |
| 2019/0158630 A1 | 5/2019 | Aragón et al. |
| 2019/0196793 A1 | 6/2019 | Jaiprakash |
| 2019/0205111 A1 | 7/2019 | Bennet et al. |
| 2019/0208031 A1 | 7/2019 | Bennet et al. |
| 2019/0238467 A1 | 8/2019 | Guan et al. |
| 2019/0238688 A1 | 8/2019 | Bermundo et al. |
| 2019/0243742 A1 | 8/2019 | Natari |
| 2019/0332357 A1 | 10/2019 | Reddy |
| 2019/0342404 A1 | 11/2019 | Kundu et al. |
| 2019/0369969 A1 | 12/2019 | Donohoe et al. |
| 2020/0026735 A1 | 1/2020 | Przada |
| 2020/0042648 A1 | 2/2020 | Rao |
| 2020/0050983 A1 | 2/2020 | Balasubramanian et al. |
| 2020/0133982 A1 | 4/2020 | Thangeswaran et al. |
| 2020/0348964 A1 | 11/2020 | Anand et al. |
| 2020/0356365 A1 | 11/2020 | Pezaris |
| 2020/0409665 A1 | 12/2020 | Swaminathan et al. |
| 2021/0004711 A1 | 1/2021 | Gupta et al. |
| 2021/0019574 A1 | 1/2021 | Voicu |
| 2021/0037110 A1 | 2/2021 | Bennet et al. |
| 2021/0092154 A1* | 3/2021 | Kumar .................. H04L 51/212 |
| 2021/0107164 A1 | 4/2021 | Singh et al. |
| 2021/0109503 A1 | 4/2021 | Singh et al. |
| 2021/0109742 A1 | 4/2021 | Bennet et al. |
| 2021/0110345 A1 | 4/2021 | Iyer et al. |
| 2021/0117162 A1 | 4/2021 | Thangaraj et al. |
| 2021/0117210 A1 | 4/2021 | Yueh |
| 2021/0117302 A1 | 4/2021 | Kadakia et al. |
| 2021/0117394 A1 | 4/2021 | Moresmau et al. |
| 2021/0117517 A1 | 4/2021 | Bregman et al. |
| 2021/0117562 A1 | 4/2021 | Balan et al. |
| 2021/0117895 A1 | 4/2021 | Tondevold et al. |
| 2021/0120044 A1 | 4/2021 | Balan et al. |
| 2021/0194994 A1 | 6/2021 | Aragón et al. |
| 2021/0286597 A1 | 9/2021 | Thangaraj et al. |
| 2021/0357503 A1 | 11/2021 | Moresmau et al. |
| 2022/0060558 A1 | 2/2022 | Bennet et al. |
| 2022/0114267 A1 | 4/2022 | Schwartz et al. |
| 2022/0116787 A1 | 4/2022 | Balan et al. |

FOREIGN PATENT DOCUMENTS

| | | |
|---|---|---|
| EP | 3732566 | 11/2020 |
| EP | 3732582 | 11/2020 |
| WO | WO2008003593 A1 | 1/2008 |
| WO | WO2015139119 A1 | 9/2015 |
| WO | WO2015154133 A1 | 10/2015 |
| WO | WO2017147694 A1 | 9/2017 |
| WO | WO2017160831 A1 | 9/2017 |
| WO | WO2019099140 A1 | 5/2019 |
| WO | WO2019133208 A1 | 7/2019 |
| WO | WO2019133209 A1 | 7/2019 |
| WO | WO2020263573 A1 | 12/2020 |
| WO | WO2021076310 A1 | 4/2021 |
| WO | WO2021076311 A1 | 4/2021 |
| WO | WO2021076312 A1 | 4/2021 |
| WO | WO2021076324 A1 | 4/2021 |
| WO | WO2021076520 A1 | 4/2021 |
| WO | WO2021076521 A1 | 4/2021 |
| WO | WO2021076791 A1 | 4/2021 |
| WO | WO2021076921 A1 | 4/2021 |

OTHER PUBLICATIONS

"International Search Report" and "Written Opinion of the International Searching Authority," Patent Cooperation Treaty Application No. PCT/US2018/056196, dated Dec. 26, 2018, 8 pages.

"International Search Report" and "Written Opinion of the International Searching Authority," Patent Cooperation Treaty Application No. PCT/US2018/064127, dated Feb. 11, 2019, 6 pages.

"International Search Report" and "Written Opinion of the International Searching Authority," Patent Cooperation Treaty Application No. PCT/US2018/064122, dated Mar. 18, 2019, 8 pages.

"Extended European Search Report" and "Written Opinion", European Application No. 17767331.6, dated Nov. 14, 2019, 6 pages.

"International Search Report" and "Written Opinion of the International Searching Authority," Patent Cooperation Treaty Application No. PCT/US2020/037028, dated Aug. 28, 2020, 13 pages.

"International Search Report" and "Written Opinion of the International Searching Authority," Patent Cooperation Treaty Application No. PCT/US2020/053141, dated Jan. 12, 2021, 8 pages.

"International Search Report" and "Written Opinion of the International Searching Authority," Patent Cooperation Treaty Application No. PCT/US2020/053419, dated Jan. 14, 2021, 14 pages.

"International Search Report" and "Written Opinion of the International Searching Authority," Patent Cooperation Treaty Application No. PCT/US2020/053138, dated Jan. 12, 2021, 8 pages.

"International Search Report" and "Written Opinion of the International Searching Authority," Patent Cooperation Treaty Application No. PCT/US2020/053139, dated Jan. 11, 2021, 8 pages.

"International Search Report" and "Written Opinion of the International Searching Authority," Patent Cooperation Treaty Application No. PCT/US2020/056026, dated Jan. 19, 2021, 16 pages.

"International Search Report" and "Written Opinion of the International Searching Authority," Patent Cooperation Treaty Application No. PCT/US2020/055829, dated Jan. 19, 2021, 18 pages.

"International Search Report" and "Written Opinion of the International Searching Authority," Patent Cooperation Treaty Application No. PCT/US2020/055418, dated Jan. 28, 2021, 8 pages.

"International Search Report" and "Written Opinion of the International Searching Authority,"Treaty Application No. PCT/US2020/055420, dated Feb. 1, 2021, 8 pages.

Bourgoiun et al., "Towards a Process Analysis Approach to Adopt Robotic Process Automation", IEEE, 2018, 8 pages.

"Extended European Search Report" and "Written Opinion", European Application No. 18879227.9, dated Mar. 15, 2021, 9 pages.

"Extended European Search Report" and "Written Opinion", European Application No. 18895108.1, dated Aug. 19, 2021, 8 pages.

"Extended European Search Report" and "Written Opinion", European Application No. 18895245.1, dated Aug. 25, 2021, 8 4 pages.

"International Search Report" and "Written Opinion of the International Searching Authority, " Patent Cooperation Treaty Application No. PCT/US2021/054415, dated Jan. 19, 2022, 8 pages.

Kuligowski, Kiely; "What Is a Document Repository?" business.

(56) References Cited

OTHER PUBLICATIONS com. [Retrieved on Dec. 12, 2021]; <URL: https://www.business.com/articles/what-is-document-repository/>, Jun. 25, 2020, 10 pages.
"International Search Report" and "Written Opinion of the International Searching Authority," Patent Cooperation Treaty Application No. PCT/US2021/054416, dated Jan. 19, 2022, 9 pages.

* cited by examiner

USE OF MULTI-FACETED TRUST SCORES FOR DECISION MAKING, ACTION TRIGGERING, AND DATA ANALYSIS AND INTERPRETATION

CROSS-REFERENCE TO RELATED APPLICATIONS

This application claims priority of U.S. Provisional Patent Application No. 62/923,377 filed on Oct. 18, 2019, entitled "Multi-Faceted Trust System," and is a Continuation-in-part of, and claims the priority benefit of, U.S. patent application Ser. No. 16/795,570 filed on Feb. 19, 2020, entitled "Multi-Faceted Trust System," which are incorporated herein by reference in their entirety.

FIELD

This application relates generally to data processing and, more specifically, to systems and methods for using multi-faceted trust scores for decision making, action triggering, and data analysis and interpretation.

BACKGROUND

Approaches to understanding data may include defensive data strategies, such as regulatory compliance, and offensive data strategies, such as self-service data analytics. However, these approaches may be inefficient in some situations or even impossible to apply, e.g., when combining internal and external data, in driving additional insights into data and making decisions based on the data.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are methods and systems for using multi-faceted trust scores in data security. In some embodiments, a method for using multi-faceted trust scores in data security may commence with determining a plurality of data facets for a data item. The method may further include determining a plurality of parameters and weights corresponding to the plurality of data facets associated with the data item. Upon determining the plurality of parameters and weights, at least one trust score for the data item may be calculated based on the plurality of parameters and weights. The method may further include selectively taking an action based on the at least one trust score.

In some example embodiments, a system for using multi-faceted trust scores in data security may include a data analyzing unit, a score calculation unit, and a processing unit. The data analyzing unit may be configured to determine a plurality of data facets for a data item. The data analyzing unit may be further configured to determine a plurality of parameters and weights corresponding to the plurality of data facets associated with the data item. The score calculation unit may be configured to calculate at least one trust score for the data item based on the plurality of parameters and weights. The processing unit may be configured to selectively take an action based on the at least trust score.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION

Figure 1:
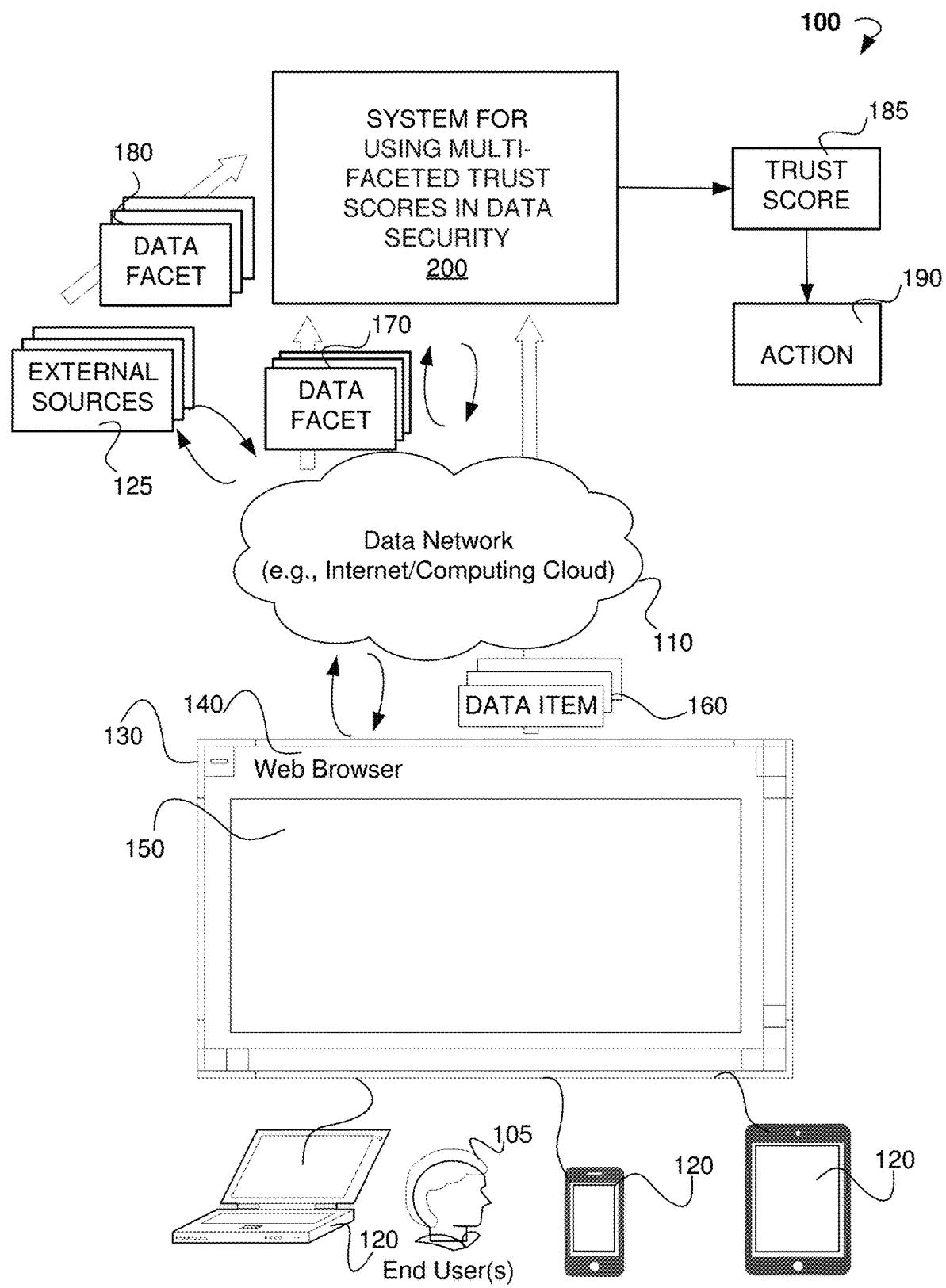
FIG. 1 illustrates an environment within which methods and systems for using multi-faceted trust scores in data security can be implemented, according to an example embodiment.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following detailed description is, therefore, not to be taken in a limiting sense and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The present disclosure relates to systems and methods for using multi-faceted trust scores in data security. The system of the present disclosure provides uses of multi-faceted trust scores of data for decision making, action triggering, and data analysis and interpretation. The multi-faceted trust score of data may be provided for more comprehensive understanding of data and may be determined using a dynamic trust model including multiple facets. The system of the present disclosure can be used to analyze critical data components or other data items and determine a degree to which the data can be trusted by the users. The degree to which the data can be trusted can be represented by a trust score of data. The trust score can be calculated based on several factors, which are referred to herein as data facets or facets. More specifically, each of the facets includes a characteristic of a data item (also referred to herein a metadata item). The trust score is also referred to as a "score" herein. The calculated trust score can be then used by the system to trigger actions, make decisions, perform data analysis, data interpretation, and so forth.

The method for using multi-faceted trust scores in data security may commence with receiving data including a plurality of data items and determining a plurality of data facets for each data item. The data facets may include objective data facets (metadata, data, business information), subjective data facets (ratings of a user), and synthetic data facets (calculated from heuristics on lineage). All data facets can be evaluated and scored. The data facets contribute to the final trust score based on their relative weights. The method may further include determining a plurality of parameters and weights corresponding to the plurality of data facets associated with the data items. In an example embodiment, the weight of a data facet can be entered by an operator based on empirical observations or established using a predetermined technique based on historical trustworthiness associated with the data facet. In some example embodiments, the parameters and weights of the facets can be determined by the system based on historical data associated with data items or facets. Upon determining the facets and corresponding parameters and weights, a trust score for each data items can be calculated based on the parameter and the weight associated with each of the facets. In an example embodiment, a trust score of the data may be calculated based on the trust scores calculated for each of the data items.

The method can further include selectively taking an action based on the trust score calculated for the data items. The action may include sending a notification to a user, triggering an automated action starting an intelligent business process management workflow, integrating the trust score into a decision table, creating and sending a report, and so forth.

Referring now to the drawings, FIG. 1 illustrates an environment 100 within which systems and methods for using multi-faceted trust scores in data security can be implemented. The environment 100 may include a data network 110 (e.g., an Internet or a computing cloud), end user(s) 105, client device(s) 120 associated with the end user 105, external sources 125, and a system 200 for using multi-faceted trust scores in data security. Client device(s) 120 may include a personal computer (PC), a desktop computer, a laptop, a smartphone, a tablet, and so forth.

The client device 120 may have a user interface 130. Furthermore, a web browser 140 may be running on the client device 120 and displayed via the user interface 130. The web browser 140 may communicate with the system 200 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The web browser 140 can render a web page associated with the system 200 which end user(s) 105 can use to calculate a trust score and take an action based on the calculated trust score. The web browser 140 can establish a communication channel with the system 200 and generate and render virtual screens based on data received from the system 200.

The system 200 may receive or collect data items 160 for which a trust score needs to be calculated. The data items 160 may be provided by the end user(s) 105 using the client device 120 or collected by the system 200 automatically. Upon receiving or collecting the data items 160, the system 200 may determine data facets 170 associated with the data items 160. The data facets 170 may include parameters of the data items 160. In some embodiments, the system 200 may also receive further data facets 180 related to the data items 160 from the external sources 125. Based on the data facets 170 and 180, the system 200 may calculate the trust score 185. The system 200 may render the results of calculation by the web browser 140 and display the trust score 185 to the end user(s) 105. Based on the trust score 185 determined for the data items 160, the system 200 may take an action 190. In an example embodiment, the action 190 may include determining whether the trust score 185 exceeds a predetermined threshold to decide whether the data including the data items 160 can be trusted. The action 190 may also include automatically starting an intelligent business process management workflow, integrating the trust score into a decision table, creating a report based on the data items 160, and so forth.

Figure 2:
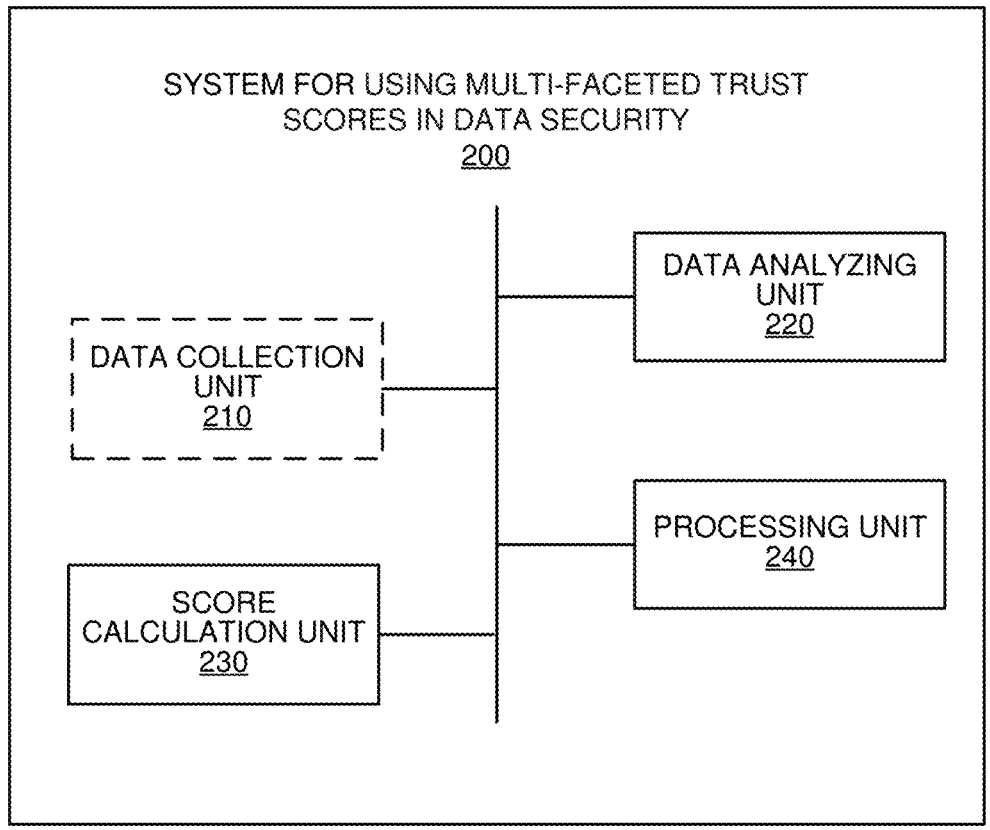
FIG. 2 is a block diagram illustrating a system for using multi-faceted trust scores in data security, according to an example embodiment.
Figure 6:
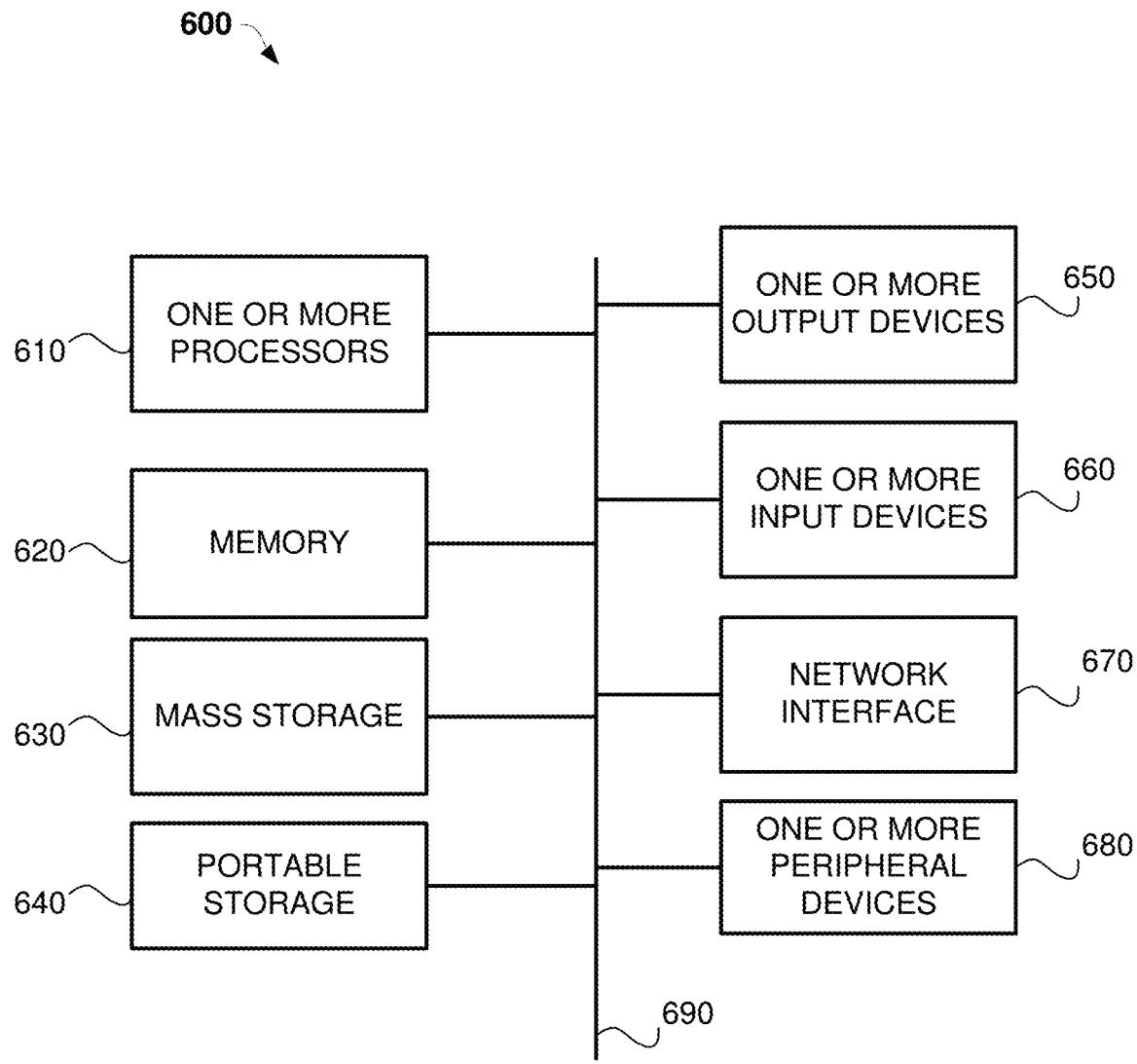
FIG. 6 is a computing system that can be used to implement a method for using multi-faceted trust scores in data security, according to an example embodiment.

FIG. 2 is a block diagram illustrating a system 200 for using multi-faceted trust scores in data security, according to an example embodiment. The system 200 may include a data analyzing unit 220, a score calculation unit 230, a processing unit 240, and, optionally, a data collection unit 210. In an example embodiment, the operations performed by each of the data collection unit 210, the data analyzing unit 220, the score calculation unit 230, and the processing unit 240 may be performed by a processor and a memory for storing instructions executable by the processor. Example one or more processors are shown in FIG. 6 as one or more processors 610. The operations performed by each of the data collection unit 210, the data analyzing unit 220, the score calculation unit 230, and the processing unit 240 of the system 200 are described in detail below with reference to FIG. 3.

Figure 3:
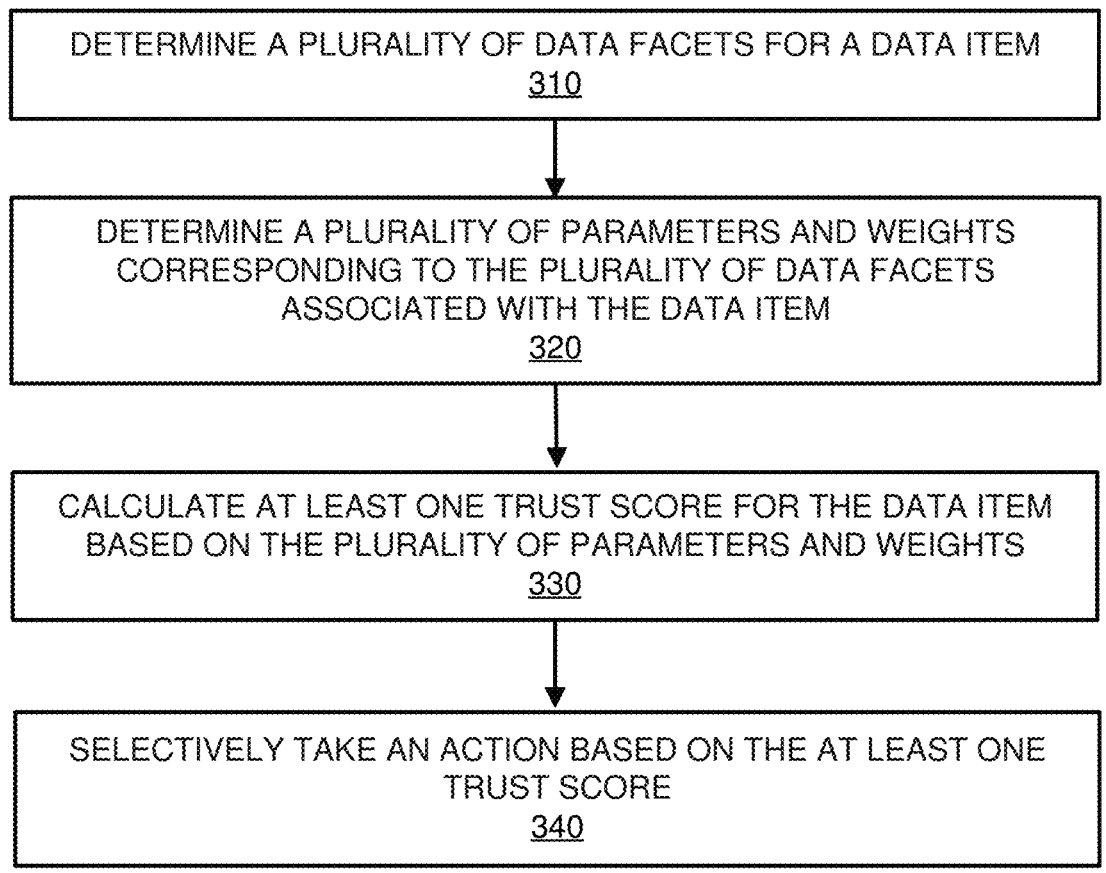
FIG. 3 is a flow diagram illustrating a method for using multi-faceted trust scores in data security, according to an example embodiment.

FIG. 3 shows a process flow diagram of a method 300 for using multi-faceted trust scores in data security, according to an example embodiment. In some embodiments, the operations may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with determining a plurality of data facets for a data item by the data analyzing unit at operation 310. In some embodiments, prior to the determination of the plurality of data facets, data including a plurality of data items may be received by the data collection unit. The data item for which the plurality of data facets is determined may be one of the plurality of data items. The data may include any type of data that needs to be analyzed, for which a trust score is required to be determined, and based on which an action needs to be taken. The data may be received from any source (for example, a database, a remote source, an online source, a cloud database, the system 200 itself, and so forth).

Each of the plurality of data facets may include a characteristic of the data item. For example, the plurality of data facets may include one or more of the following: data quality dimensions, criticality of the data item, governance of the data item (governed/not governed), a rating, a review, an issue, a proximity of the data item to a source (for example, how close the data item is to the source), an existence of a data lineage, a fact of scanning of the data item from an active source or a spreadsheet, a tag associated with the data item, a frequency of update, a frequency of use, a null value, usefulness of the data item for an intended purpose, and so forth. The data facets may include objective data facets (metadata, data, business information), subjective data facets (for example, based on ratings of a user), and synthetic data facets (calculated from heuristics based on lineage).

At operation 320, the data analyzing unit may determine a plurality of parameters and weights corresponding to the plurality of data facets associated with the data item. The parameters may include, for example, a value of the data facet, a 'yes/no' parameter, a percentage, a range, information entered by a user in an application, information provided in any way by the user, whether the data item was analyzed, whether the data item was scheduled for the analysis, frequency of analysis of the data item, whether the data item was analyzed manually by a user or automatically by the system, and so forth.

The method 300 may continue with calculating at least one trust score for the data item based on the plurality of parameters and weights by the score calculation unit at operation 330. In an example embodiment, the method 300 may optionally include calculating a plurality of trust scores associated with each data facet of the plurality of data facets to obtain a plurality of trust scores for the plurality of data facets. The calculation of the plurality of trust scores may be based on the plurality of parameters and weights associated with each data facet of the plurality of data facets. In an example embodiment, the at least one trust score of the data item may be a sum of the plurality of trust scores associated with each data facet of the plurality of data facets. Specifically, the calculation of the at least one trust score may include summing all parameters of facets (related to the metadata item) multiplied by corresponding weights and dividing the summation by the number of facets related to the data item. The result can be a number between 0 and 1 or a percentage between 0% and 100%.

The trust score may be calculated for each of the plurality of data items of data received by the data collection unit. Thereafter, the method 300 may proceed with calculating, by the score calculation unit, a data trust score for the data by summarizing the trust score for each of the plurality of data items and dividing the summation by the number of data items related to the data.

In an example embodiment, the method 300 may optionally include selecting, from the plurality of data facets, one or more data facets contributing to the trust score for each of the data items. In this embodiment, the calculation of the trust score for each of the plurality of data items may be based on the parameter and the weight associated with the selected one or more data facets.

A decision table may be used to determine which data facets contribute to the trust score of the data item (i.e., to determine which data facets to use and which weights to assign to each data facet). The decision table can use a type of the data item (for example, tables and columns may be evaluated differently) and other criteria. The result of the decision is a list of selected data facets with parameters and weights. The data intelligence (DI) repository may then calculate each data facet based on the information the data facet contains, using the parameters provided. For example, the DI repository may check if a business term was associated with the data item by determining whether the data item is tagged by the tag of type "Business Glossary." Other types of tags may also be referenced in the trust facet configuration. All trust scores can be then aggregated, taking into account the weights of each data facet (some data facets may contribute more than others to the final trust score). The final score and each individual data facet score can be stored alongside the data item. The DI repository may provide some trust configurations that can be readjusted based on specific needs. Other data facets can be added to the data facets provided by default.

At operation 340, the processing unit may selectively take an action based on the at least one trust score. Therefore, once the trust score is calculated, the trust score can be used as an input for a variety of use cases inside a data intelligence model (e.g., a machine learning an artificial intelligence node) itself or other products. Specifically, the trust score can trigger predetermined actions when it reaches specific thresholds for the data item and/or can be used in conjunction with other data intelligence information to provide additional information associated with the data.

In some example embodiments, the selective taking of the action may be further based on information external to the data item. For example, further data facets associated with the data item may be received from external sources. In these embodiments, the trust score can be also combined with (or constructed entirely from) information from sources outside of the data intelligence model in order to drive additional information into data and decisions beyond the data intelligence model.

In an example embodiment, the action may include determining that the at least one trust score has exceeded a predetermined threshold or determining that the at least one trust score is lower than the predetermined threshold. The trust score may be expressed as a percentage. For example, the trust score that reached 100% threshold means "complete trust," while the trust score is at 0% means "no trust at all." The trust score and how each data facet has contributed to the trust score can be visualized in order to evaluate why the trust score is what it is and what has caused the trust score to change over time. Predetermined thresholds can be associated with different levels of trust for more intuitive visualization; for example, a trust score that has exceeded 90% threshold can be shown in green, a trust score that is under the 50% threshold can be shown in red, and so forth. Data facet visualization may also be indicative of whether a data facet is objective (such as a metadata field value), subjective (such as user ratings), or synthetic (for example, a facet calculated from heuristics on lineage).

In an example embodiment, the action may include one or more of the following: sending a notification to at least one user, performing an automated action starting an intelligent business process management workflow, integrating the at least one trust score into a decision table, creating a report, and so forth.

In an example embodiment, the at least one trust score of the data item may be combined with at least one lineage associated with the data item. The at least one lineage may be based on evaluation of data provenance of the data item. In this embodiment, the selection of the action may be based on the combination of the at least trust score and the at least one lineage.

The method 300 may further include determining that the data item has been changed. The change may include at least one of the following: re-analysis of the data item, manual tagging of the data item, a rating assigned to the data item, a trigger initiated by a user, and so forth. Based on this determination, the at least one trust score can be recalculated for the data item.

In an example embodiment, facets that contribute to the trust score can be defined in policies. Specifically, a policy type of "enrichment" can be defined and used for any data that can contribute additional data. The facets may include a type of the data item, a catalog in which the data item is placed, and so forth. More facets can be added if additional fine-grained calculations are needed. The result of setting the policy is a list of "Trust Facets." A facet can define what data item needs to be considered and the relative weight of the facet in the overall calculation. Upon setting the policies, the trust score can be calculated by a backend service that reacts to events. The trust score and an explanation as to what facets contributed to the trust score can be displayed.

The facets contributing to the trust score may include the following data facets: quality, ratings average, ratings count, tags, linked items, and so forth. The weight of each data facet may be determined or set in the range between 0 and 1. The quality may be calculated by a quality process (which can be driven by a configuration). The ratings average is an average of ratings given to the data item, e.g., when ratings go between 1 and 5, 3 is average. A rating of 1 results in a score of 0, a rating of 5 results in a score of 1, and a rating of 3 results in a score of 0.5. The ratings count is a minimum value for the count of ratings to count. If there are more, the score weighted by the count for each rating is calculated. Since ratings with low counts are filtered out, the ratings count can give a different result than the average. The tags can include determining whether the data item is tagged by any tag in the hierarchy of the given tag name. For example, any tag created from a glossary term may increase the trust score, meaning that if a data item is linked to a glossary term, the data item has been analyzed somewhat and is trusted more. The linked items may be taken and the average of their trust score can be calculated. For example, a trust score of a dataset may include the trust score of the data items referenced by the dataset, the score of a table may include the score of each column, and so forth.

Figure 4:
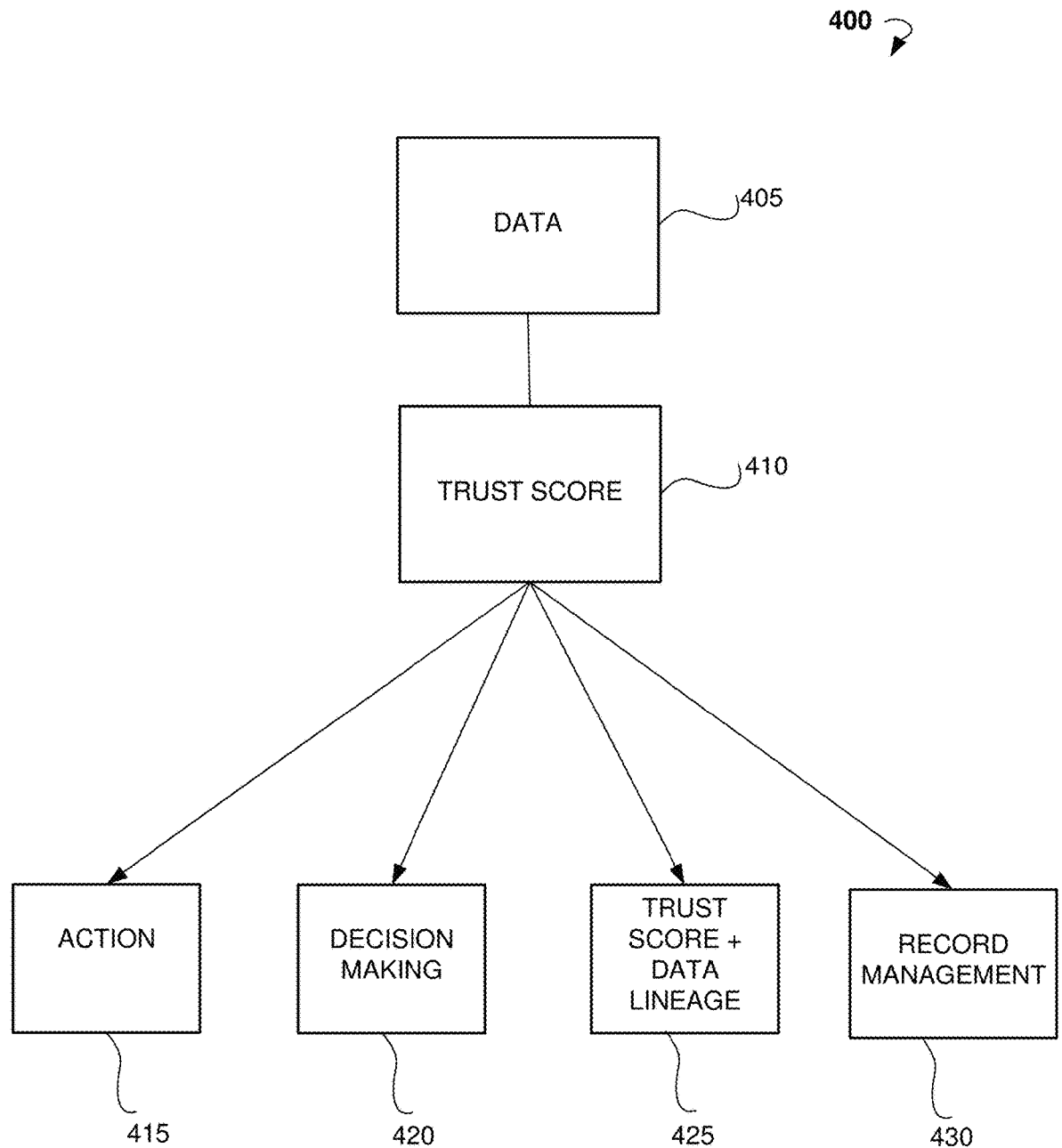
FIG. 4 is a schematic diagram showing multiple use cases for using multi-faceted trust scores in data security, according to an example embodiment.

FIG. 4 is a schematic diagram 400 showing multiple use cases for using multi-faceted trust scores in data security, according to an example embodiment. Upon receiving data 405 that include a plurality of data items, a trust scope 410 for the data 405 may be calculated. When the trust score 410 passes a predetermined threshold, a predetermined action 415 can be triggered. The predetermined action 415 may include sending a notification to specific users, triggering automated actions, such as starting an intelligent business process management workflow, generating a report, and so forth. For example, a user may generate a report based on data available in the system. Upon reviewing the trust score for the data based on which the report was generated, the user may determine, based on the trust score, whether the data can be trusted and whether the report is based on the trusted data.

In an example embodiment, the action 415 may include providing a recommendation on how to increase the trust score 410 of the data 405. The recommendation may include performing additional analysis, linking the data 405 to specific datasets, adding additional data items to the data 405, scheduling an automatic periodical analysis of the data 405, and so forth.

In an example embodiment, the action 415 may include marking one or more data items of data 405 as critical. For example, when the trust score 410 of the data 405 or individual data items of the data 405 becomes lower than a predetermined threshold, the data 405 or individual data items of the data 405 may be marked as critical and a notification informing about critical data may be sent to a user. The user may perform an investigation of changes that lowered the trust score 410 of the data 405 or individual data items of the data 405.

In an example embodiment, the action 415 may include sending a notification to the user when the trust score 410 exceeds a value preselected by a user. For example, the user may want to use the data 405, but cannot use the data 405 at the moment because the data 405 have a low trust score. The user may set a value of the trust score 410, e.g., 60%, upon exceeding which by the data 405 the notification should be sent to the user.

In another example embodiments, the trust score 410 can be integrated into the decision making 420. The trust score 410 can become a factor in decision tables used by a policy engine to drive decisions inside and outside of the data intelligence model associated with the system 200. For example, the decision as to whether the data 405 can be used to create reports can be based on the trust score 410.

Further example decision can be made based on the trust score 410 including providing access to the data 405 to specific users based on the data process information. The data process information may include, among other things, the trust score 410 of the data 405. For example, a database table may be restricted from being shown to prospective customers if the trust score 410 of the database table is below a predetermined threshold, i.e., when the data in the database table are not reliable. Vice versa, if the trust score 410 of the database table exceeds the predetermined threshold, a decision to show the database table to customers may be taken because there is high probability that the data in the database table are accurate.

In a further example embodiment, a portion of data may be hidden from users based on privileges assigned to the users. For example, the privileges assigned to the users may be used to calculate the trust score of the data and to determine whether the data or a portion of the data needs to be hidden from a user having specific privileges. For example, customer names in a database table may be hidden from users having a low privilege in the system in which the database table is stored.

In a further example embodiment, the data 405 may include real-world data, e.g., customer information, which may not be allowed to be shown to users. Based on the trust score 410, a decision to convert at least a portion of the data 405 into metadata allowed to be shown to the users may be taken. For example, a customer name (real-world data) can be converted into a customer identification number (metadata), a total amount of money paid by a customer (real-world data) can be converted into a minimum value and a maximum value of the amount paid by the customer (metadata).

In a further example embodiment, the decision may be made based on whether the data 405 are collected by the system of the user from internal sources (e.g., inside an organization of the user) or whether at least a portion of the data is collected from outside sources (e.g., county statistic data). The data that include information collected from outside sources may have a lower trust score than the data managed completely by the user.

In an example embodiment, the trust score 410 may be combined with lineage results shown as data lineage 425. A low-trust table (i.e., a table having a low trust score) may be connected via the data lineage with a high-trust table, which may result in a potential issue (e.g., when the first table needs to be trusted more or the second table needs to be trusted less) or an indication that the data lineage covers a "cleaning up" operation. An indication showing the trust score of tables and the data lineage of the table may be provided to the user for review.

In further example embodiment, a high-trust table (i.e., a table having a high trust score) may be connected via the data lineage with a low trust table, which may result in a potential issue (the first table needs to be trusted less or the second needs to be trusted more) or an indication that the data lineage covers integrating less trusted data or performs dubious calculations. These issue may be reviewed by a user.

Moreover, the data lineage may be used in the trust calculation itself: a table the data provenance of which is proven by the data lineage may have a higher trust score than a table the data provenance of which is unknown. Tables derived from highly trusted data may be more trusted unless the lineage transformation itself is not trusted. Tables contributing to highly trusted tables can be considered more trusted (or indicate that these tables need a higher level of scrutiny to ensure the downstream data should effectively be trusted).

In an example embodiment, the system 200 can be used to determine how much a set of data lineage information can be relied on, a confidence level related to the results representing all the places to which a data item may have flowed, a confidence level related to the fact that a source of information is source X (but not source Y), a confidence level related to the fact that a source is a reliable source, and so forth.

The data lineage may include information on how data in different parts of an organization (e.g., customer information, a database, employee information, and the like) relate to each other. For example, the data may include a trial table storing information about users that inquired about a product on a website associated with the organization. The data may further include a customer database storing information of customers that already bought a product. The lineage may show that some of the customers in the customer database bought the product after they asked about the product on the website and were contacted by a manager of the website. Therefore, even if the information of customers and prospective customers is stored in the same customer database, the lineage may show specific details as to where the customer information is received from. This lineage may be used, for example, when specific customers need to be selected and stored in an email campaign table.

In an example embodiment, a first table may store customer names. The lineage may show that the customer names were copied from a second table having a high trust score. Therefore, based on the lineage, the first table may also have the high trust score.

The lineage can show that data flow from source A to source B but the trust scores of source A and source B are different, which may be an indication that there is an issue with the data that needs to be investigated by the user. For example, a user may have a table with a high trust score and needs to add data to the table, and the lineage can show that a source from which the data needs to be added has a low trust score. In another example, the user may have data with a high trust score. An application may use these data and provide a result. The lineage can show that the application has a low trust score, e.g., because the user has no source code for the application and the operations performed by the application are unknown. Therefore, the result provided by the application may have a trust score lower that the trust score of the original data used by the application.

In another example embodiment, the data in a database may come from a highly trusted source and copied to a table for review by customers. However, the table may have a low trust score because the customers did not review the table or did not rate the table for some reasons. Based on the lineage showing that the data in the table have a highly trusted source, the trust score of the table for customers may be increased.

In another example embodiment, the trust score of the data may be based on ratings provided to the data by the users. The lineage may show that some users rate high everything they review. Therefore, the rating provided by these users may be of low trust. In this case, a weight assigned to ratings may be lowered. The lineage may further show that the data are received from five tables each having a specific trust score. The weight assigned to the trust scores of these five tables may be increased. The trust score of the data may be determined as an average of the trust scores of these five tables.

In further example embodiments, the trust score 410 can be used in record management 430. For example, the trust score 410 can be used to determine a confidence level of the fact that a data item is or is not personally identifying information, that a given alert (raised by any of products/applications) is not a false positive, that a robotic automation process can work correctly each time (e.g., if there is a web page position dependency, the risk that the process can be broken by someone changing the page is high), that a set of policies can work as intended (e.g., if there are multiple nested policies or policies specified by different people, the side effects resulting from the ways in which they combine can result in unintended consequences), a confidence level of a validation process (e.g., whether every figure in the quarterly report was validated, and what level of confidence can be associated with each of the sources and calculations that informed that calculation), a confidence level of the fact that a given document is a reliable source of information, that all personally identifying information in a document (or all documents) is redacted, that a document was classified correctly, and so forth.

In terms of data mining, the trust score 410 can be used to determine whether content metadata has been extracted from a document, whether content metadata was extracted correctly, whether content metadata was classified correctly (e.g., that 1234565890 is really an account number and not an invoice number), and so forth.

In terms of record management 430, the trust score 410 can be also used to determine whether the content can be deleted, or whether long term/permanent retention of the content can be applied. In some embodiment, the trust score 410 can be applied to documents to determine whether a document has a trust score that exceeds a predetermined threshold.

Figure 5:
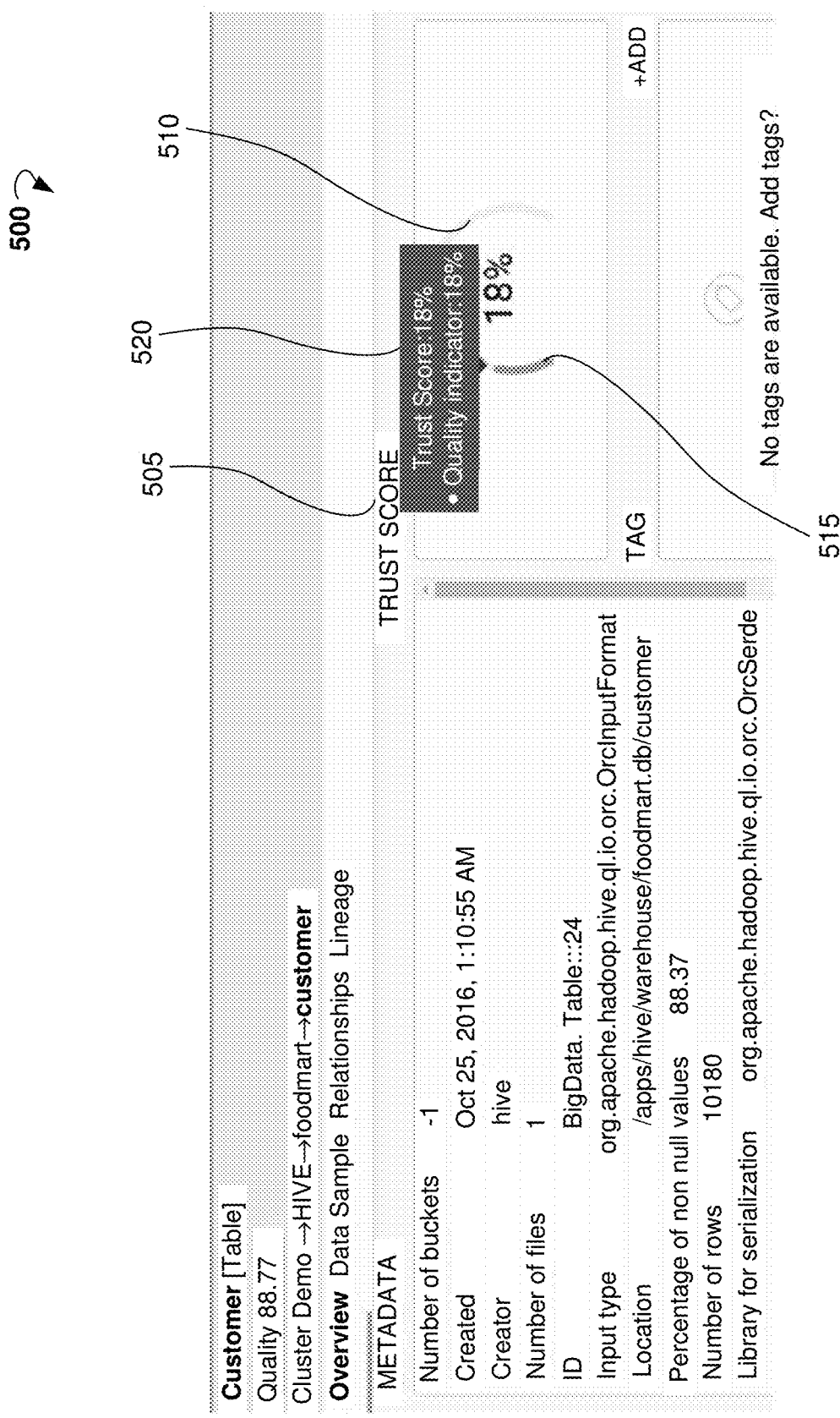
FIG. 5 is a schematic diagram showing a widget for calculating and displaying a trust score, according to an example embodiment.

FIG. 5 is a schematic diagram showing a widget 500 for calculating and displaying a trust score 505, according to an example embodiment. The user interface may be using a chart 510, such as an ngx-chart (Gauge), to show the trust score 505 graphically. Red/yellow/green colors 515 may be shown based on the trust score 505 (green if over 90%, yellow if over 60%, and red otherwise). The colors can be configurable. Upon hovering over the chart 510 by the user, corresponding explanations 520 can be shown to the user. In an example embodiment, a widget, such as the widget 500 showing the trust score 505 associated with the quality, can be shown in search results when the user search for specific data.

FIG. 6 illustrates an exemplary computing system 600 that may be used to implement embodiments described herein. The exemplary computing system 600 of FIG. 6 may include one or more processors 610 and memory 620. Memory 620 may store, in part, instructions and data for execution by the one or more processors 610. Memory 620 can store the executable code when the exemplary computing system 600 is in operation. The exemplary computing system 600 of FIG. 6 may further include a mass storage 630, portable storage 640, one or more output devices 650, one or more input devices 660, a network interface 670, and one or more peripheral devices 680.

The components shown in FIG. 6 are depicted as being connected via a single bus 690. The components may be connected through one or more data transport means. The one or more processors 610 and memory 620 may be connected via a local microprocessor bus, and the mass storage 630, one or more peripheral devices 680, portable storage 640, and network interface 670 may be connected via one or more input/output buses.

Mass storage 630, which may be implemented with a magnetic disk drive or an optical disk drive, is a non-volatile storage device for storing data and instructions for use by a magnetic disk or an optical disk drive, which in turn may be used by one or more processors 610. Mass storage 630 can store the system software for implementing embodiments described herein for purposes of loading that software into memory 620.

Portable storage 640 may operate in conjunction with a portable non-volatile storage medium, such as a compact disk (CD) or digital video disc (DVD), to input and output data and code to and from the computing system 600 of FIG. 6. The system software for implementing embodiments described herein may be stored on such a portable medium and input to the computing system 600 via the portable storage 640.

One or more input devices 660 provide a portion of a user interface. The one or more input devices 660 may include an alphanumeric keypad, such as a keyboard, for inputting alphanumeric and other information, or a pointing device, such as a mouse, a trackball, a stylus, or cursor direction keys. Additionally, the computing system 600 as shown in FIG. 6 includes one or more output devices 650. Suitable one or more output devices 650 include speakers, printers, network interfaces, and monitors.

Network interface 670 can be utilized to communicate with external devices, external computing devices, servers, and networked systems via one or more communications networks such as one or more wired, wireless, or optical networks including, for example, the Internet, an intranet, LAN, WAN, cellular phone networks (e.g., Global System for Mobile communications network, packet switching communications network, circuit switching communications network), Bluetooth radio, and an IEEE 802.11-based radio frequency network, among others. Network interface 670 may be a network interface card, such as an Ethernet card, optical transceiver, radio frequency transceiver, or any other type of device that can send and receive information. Other examples of such network interfaces may include Bluetooth®, 3G, 4G, and Wi-Fi® radios in mobile computing devices as well as a USB.

One or more peripheral devices 680 may include any type of computer support device to add additional functionality to the computing system. The one or more peripheral devices 680 may include a modem or a router.

The components contained in the exemplary computing system 600 of FIG. 6 are those typically found in computing systems that may be suitable for use with embodiments described herein and are intended to represent a broad category of such computer components that are well known in the art. Thus, the exemplary computing system 600 of FIG. 6 can be a PC, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk.

Volatile media include dynamic memory, such as random access memory (RAM). Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, various embodiments of methods and systems for using multi-faceted trust scores in data security have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A method for applying multi-faceted trust scores in data security for computer network data, the method comprising:
   determining a plurality of data facets for data items collected from the computer network data, the data facets comprising metadata associated with the data items including objective data facets, subjective data facets, and synthetic data facets for each collected data item, the objective data facets based on objective metadata associated with the collected data items, the subjective data facets based on a rating of a user, and the synthetic data facets calculated from heuristics associated with the data items, the data facets being determined from a decision table;
   determining, a plurality of parameters and weights corresponding to the plurality of data facets including the objective data facets, the subjective data facets, and the synthetic data facets associated with the data items, the parameters and weights being determined based on historical data associated with the data items or the data facets;
   selecting, from the decision table, one or more data facets for each data item, the selected data facets contributing to a final trust score based on their relative weights;
   calculating at least one multi-faceted trust score for each data item as a sum of a plurality of trust scores associated with the selected data facets;
   combining the at least one multi-faceted trust score of the data item with at least one lineage associated with the data item, wherein the at least one lineage is based on evaluation of data provenance of the data item;
   selectively taking a predetermined action based on the at least one multi-faceted trust score and the at least one lineage, the predetermined action including one or more of: notifying at least one user, an automated action starting an intelligent business process management workflow, integrating the at least one multi-faceted trust score into a decision table, and creating a report; and
   providing the at least one multi-faceted trust score for the plurality of data items to a client device user display.

2. The method of claim 1, wherein the selective predetermined action includes one or more following:
   determining that the final multi-faceted trust score exceeds a predetermined threshold; and
   determining that the final multi-faceted trust score is lower than the predetermined threshold.

3. The method of claim 1, wherein the selectively taking the action is further based on information external to the data items.

4. The method of claim 1, wherein each of the plurality of data facets includes a characteristic of the data item.

5. The method of claim 1, wherein the plurality of data facets including the objective data facets, the subjective data facets, and the synthetic data facets comprise at least one of the following: data quality dimensions, criticality of the data item, governance of the data item, a rating, a review, an issue, a proximity of the data item to a source, an existence of a data lineage, a fact of scanning the data item from an active source or a spreadsheet, a tag associated with the data item, a frequency of update, a frequency of use, a null value, and usefulness of the data item for an intended purpose.

6. The method of claim 1, further comprising:
   determining that the data item has been changed; and
   based on the determination, recalculating the at least one multi-faceted trust score for the data item.

7. A system for applying multi-faceted trust scores in data security for computer network data, the system comprising:
   a data collection processor configured to:
      receive data, the data including a plurality of data items;
   a data analyzing processor configured to:
      determine a plurality of data facets for the plurality of data items collected from the computer network data, the data facets comprising metadata associated with the data items including objective data facets, subjective data facets, and synthetic data facets for each collected data item, the objective data facets based on objective metadata associated with the collected data items, the subjective data facets based on a rating of a user, and the synthetic data facets calculated from heuristics associated with the data items, the data facets being determined from a decision table; and
      determine a plurality of parameters and weights corresponding to the plurality of data facets including the objective data facets, the subjective data facets, and the synthetic data facets associated with the data items, the parameters and weights being determined based on historical data associated with the data items or the data facets;
      select, from the decision table, one or more data facets for each data item, the selected data facets contributing to a final trust score based on their relative weights;
   a score calculation processor configured to:
      calculate at least one multi-faceted trust score for each data item as a sum of a plurality of trust scores associated with the selected data facets;
   a processor configured to:

combine the at least one multi-faceted trust score of the data item with at least one lineage associated with the data item, wherein the at least one lineage is based on evaluation of data provenance of the data item;

selectively take a predetermined action based on the final trust score and the at least one lineage, the predetermined action including one or more of: notifying at least one user, an automated action starting an intelligent business process management workflow, integrating the final trust score into a decision table, and creating a report; and provide the final multi-faceted trust score for the plurality of data items to a client device user display.

8. The system of claim 7, wherein the action includes one or more following:
   determining that the final multi-faceted trust score exceeds a predetermined threshold; and
   determining that the final multi-faceted trust score is lower than the predetermined threshold.

9. The system of claim 7, wherein the plurality of data facets including the objective data facets, the subjective data facets, and the synthetic data facets-comprise at least one of the following: data quality dimensions, criticality of the data item, governance of the data item, a rating, a review, an issue, a proximity of the data item to a source, an existence of a data lineage, a fact of scanning the data item from an active source or a spreadsheet, a tag associated with the data item, a frequency of update, a frequency of use, a null value, and usefulness of the data item for an intended purpose.

10. A system for applying multi-faceted trust scores in data security for computer network data, the system comprising:
   a data collection processor configured to receive data, the data including a plurality of data items, the plurality of data items including at least the data item;
   a data analyzing processor configured to:
      determine a plurality of data facets for the data items collected from a computer network data, the data facets comprising metadata associated with the data items including objective data facets, subjective data facets, and synthetic data facets for each collected data item, the objective data facets based on objective metadata associated with the collected data items, the subjective data facets based on a rating of a user, and the synthetic data facets calculated from heuristics associated with the data items, the data facets are determined from a decision table;
   determine a plurality of parameters and weights corresponding to the plurality of data facets including the objective data facets, the subjective data facets, and the synthetic data facets associated with the data item, the parameters and weights being determined based on historical data associated with the data items or the data facets; and a score calculation processor configured to:
   calculate at least one multi-faceted trust score for the data item based on the plurality of parameters and weights applying the decision table comprising the plurality of parameters and weights; and
   combine the at least one multi-faceted trust score of the data item with at least one lineage associated with the data item, wherein the at least one lineage is based on evaluation of data provenance of the data item; and a processor configured to:
   selectively take a predetermined action based on the at least one multi-faceted trust score and the at least one lineage, the predetermined action including one or more of: notifying at least one user, an automated action starting an intelligent business process management workflow, integrating the at least one multi-faceted trust score into a decision table, and creating a report; and provide the at least one multi-faceted trust score to a client device user display.

* * * * *